(No Model.) 6 Sheets—Sheet 1.
J. S. DETRICK & W. T. SMITH.
COMBINED SAW FILING AND SETTING MACHINE.
No. 295,115. Patented Mar. 11, 1884.
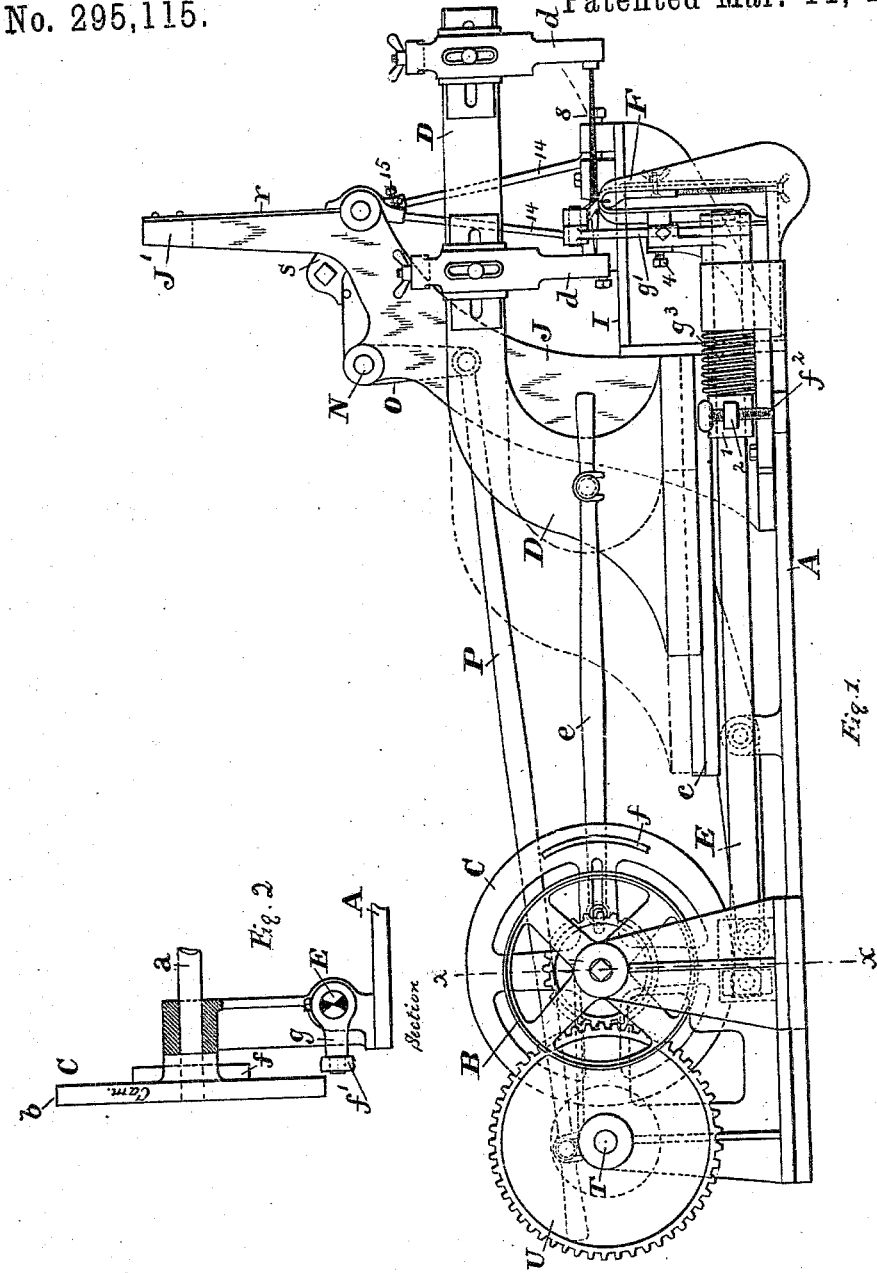
Witnesses:
A. E. Eader
John E. Morris
Inventors:
Jacob S. Detrick
Wm T. Smith
By Chas. B. Mann
Attorney

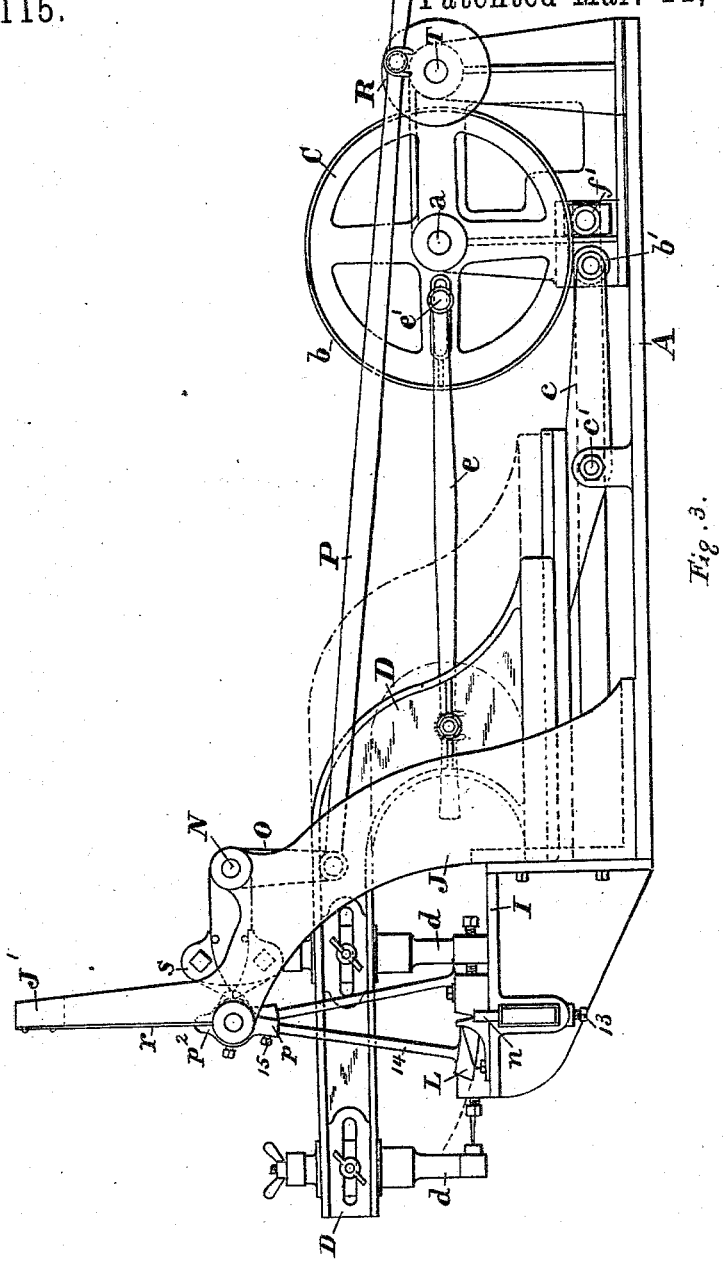

(No Model.) 6 Sheets—Sheet 3.
J. S. DETRICK & W. T. SMITH.
COMBINED SAW FILING AND SETTING MACHINE.
No. 295,115. Patented Mar. 11, 1884.
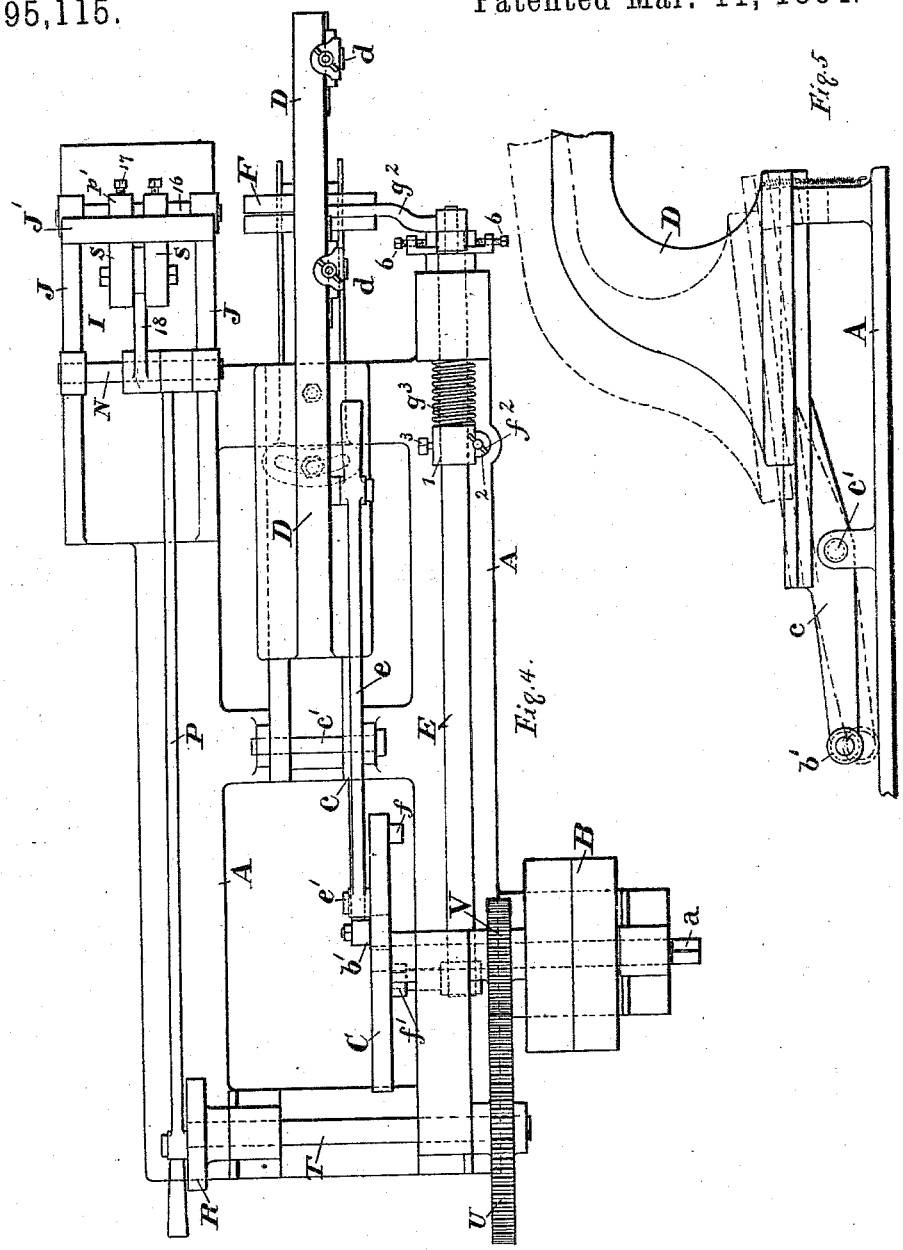
Witnesses:
A. E. Eader
John E. Morris
Inventors
Jacob S. Detrick
Wm T. Smith
By Chas B. Mann
Attorney.

(No Model.)

6 Sheets—Sheet 4.

J. S. DETRICK & W. T. SMITH.
COMBINED SAW FILING AND SETTING MACHINE.

No. 295,115.

Patented Mar. 11, 1884.

Witnesses:
A. E. Eader
John E. Morris

Inventors:
Jacob S. Detrick
Wm T. Smith
By Chas B. Mann
Attorney:

(No Model.)
6 Sheets—Sheet 5.
J. S. DETRICK & W. T. SMITH.
COMBINED SAW FILING AND SETTING MACHINE.
No. 295,115.                    Patented Mar. 11, 1884.
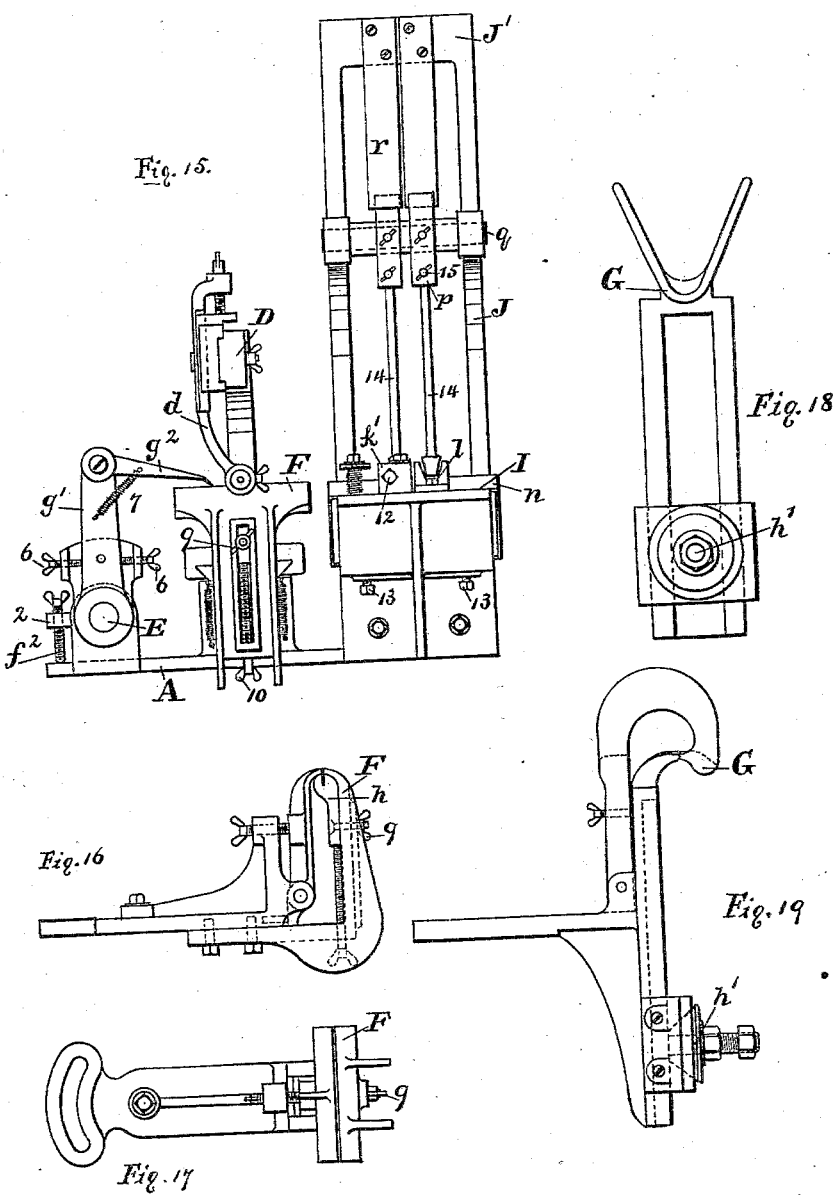
Witnesses:
A. E. Eader
John E. Morris.
Inventors:
Jacob S. Detrick
Wm T. Smith
By Chas B. Mann
Attorney.

(No Model.) 6 Sheets—Sheet 6.

J. S. DETRICK & W. T. SMITH.
COMBINED SAW FILING AND SETTING MACHINE.

No. 295,115. Patented Mar. 11, 1884.

Witnesses:
A. C. Eader
John E. Morris.

Inventors:
Jacob S. Detrick
Wm T. Smith
By Chas B. Mann
Attorney.

UNITED STATES PATENT OFFICE.

JACOB S. DETRICK AND WILLIAM T. SMITH, OF BALTIMORE, MARYLAND.

COMBINED SAW FILING AND SETTING MACHINE.

SPECIFICATION forming part of Letters Patent No. 295,115, dated March 11, 1884.

Application filed April 24, 1883. (No model.)

*To all whom it may concern:*

Be it known that we, JACOB S. DETRICK and WILLIAM T. SMITH, citizens of the United States, residing at Baltimore, in the State of Maryland, have invented certain new and useful Improvements in Saw Filing and Setting Machines, of which the following is a specification, reference being had therein to the accompanying drawings.

Our invention relates to certain improvements in saw filing and setting machines, the object of the invention being to provide a machine in which instrumentalities shall be organized to effect the filing and setting of the teeth of saws.

The machine is designed for either band-saws or circular saws, and all the parts are made so thoroughly adjustable that it is adapted for saws of any size.

The construction of the machine will first be described, and then the features of construction and the combinations of parts which constitute the invention will be designated in the claims.

Figure 6:
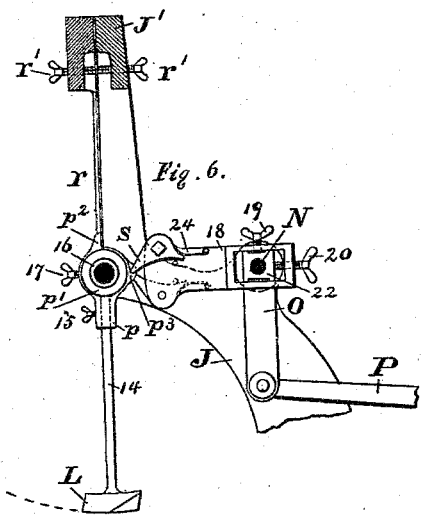
Figure 7:
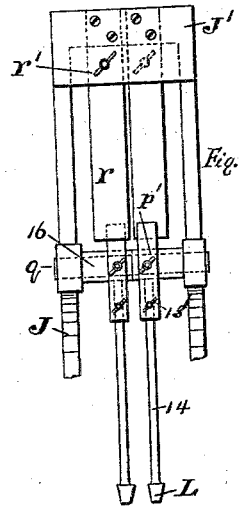
Figure 8:
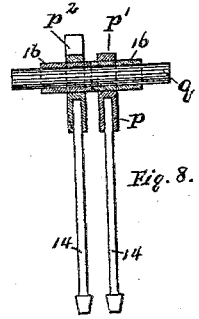
Figure 9:
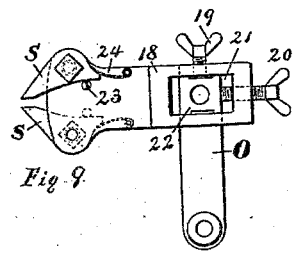
Figure 11:
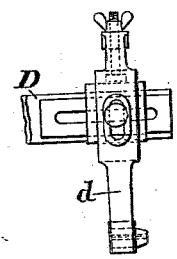
Figure 12:
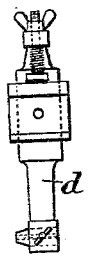
Figure 13:
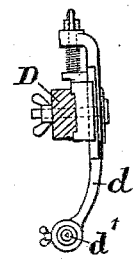
Figure 10:
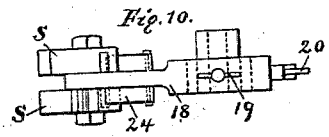
Figure 14:
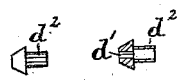
Figure 20:
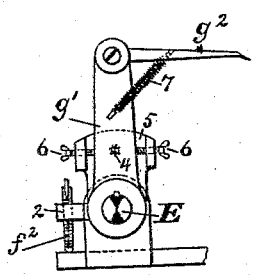
Figures 21, 22:
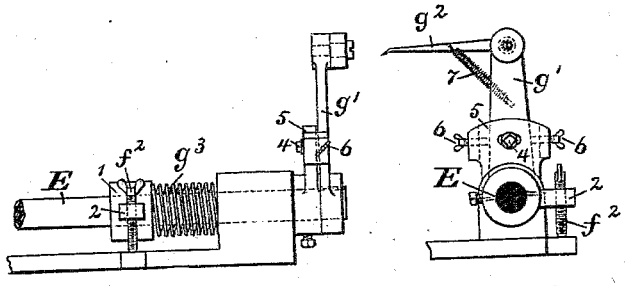
Figure 23:
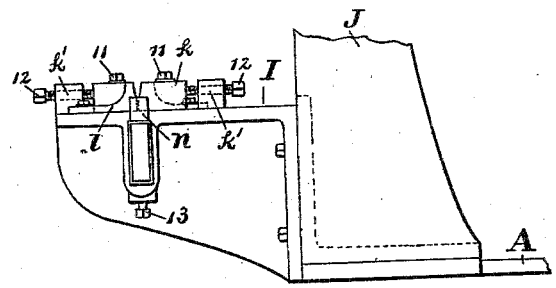
Figure 24:
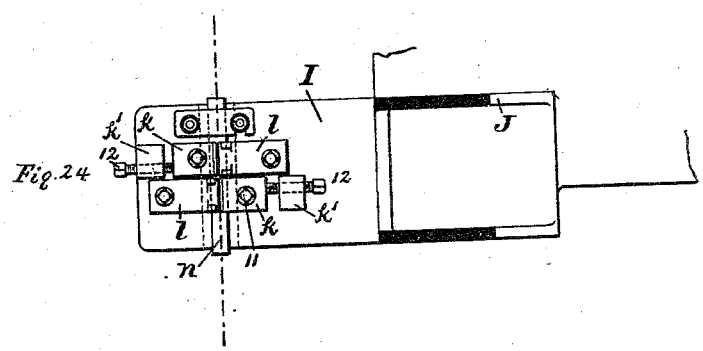

In the drawings hereto annexed, Figure 1 is an elevation of one side of the machine. Fig. 2 is a vertical section on the line $x\,x$, Fig. 1. Fig. 3 is an elevation of the other side of the machine. Fig. 4 is a top view of the machine. Fig. 5 is a view of the pivoted slide separate. Fig. 6 is a vertical sectional view of the frame whereon the hammers are pivoted. Fig. 7 is a front view of the hammer-supporting frame. Fig. 8 is a detail in section, showing the hammers pivoted. Figs. 9 and 10 are side and top views of the hammer-actuating device. Figs. 11, 12, and 13 are views of the file-holder. Fig. 14 shows views of the rotatable seats of file-holders. Fig. 15 is a front end elevation of the machine. Figs. 16 and 17 are views of the jaws to hold and guide a band-saw. Figs. 18 and 19 are views of a pivot and jaws to hold and guide a circular saw. Figs. 20, 21, and 22 are views of the saw-feed mechanism. Figs. 23 and 24 are views of the anvil-blocks.

The letter A designates the base-plate; B, a fast and a loose pulley on the same shaft, $a$, over which a belt passes for driving the machine.

On the shaft $a$ a cam-wheel, C, is mounted. The rim $b$ of this wheel is a cam, and acts on the friction-roller $b'$ at the end of the pivoted slide-rest $c$. The curved arm D, which carries the file-holders $d$, reciprocates, as indicated by broken lines, on this pivoted slide-rest. A pitman-rod, $e$, has one end connected to the curved arm, and the other end to a wrist-pin, $e'$, on one side of the cam-wheel, and thereby a reciprocating movement is given to the file-holder arm. The wrist-pin is adjustable in a radial slot, so as to give more or less movement to the file-holder. On the other side of the cam-wheel is a flange, $f$, which itself is a cam, and acts on a friction-roller, $f'$, at the end of an arm, $g$, attached to one end of a rock-shaft, E, which latter has at the other end an upright arm, $g'$, which carries a pawl, $g^2$, for feeding the saw intermittently. A stout spiral spring, $g^3$, around the rock-shaft serves to keep it normally turned one way, while the arm $g$ (when depressed by the cam-flange $f$) serves to turn or rock the shaft the opposite way.

The extent of movement of the feed-pawl $g^2$ is regulated by the adjustable stop device or screw $f^2$, consisting of a collar, 1, on the rock-shaft, said collar having a lug, 2, projecting, and being adjustable about the shaft by means of a set-screw, 3. The lower end of the regulating-screw in the projecting lug comes in contact with the base-plate, and stops the rock-shaft from any further movement in that direction. By turning this regulating-screw $f^2$ a greater or less movement may be given the feed-pawl $g^2$, thereby adapting it to saw-teeth of different sizes. When the extent of movement of the feed-pawl is thus altered, if necessary, the pawl may also be readjusted by shifting the position of the upright arm $g'$ on the rock-shaft. This upright is held by three screws. One screw, 4, passes through the upright arm, and is set in a slot in a short arm, 5, which is fast to the shaft, and another screw, 6, is at each side of the arm. A spring, 7, connects the feed-pawl and upright arm.

The file-holders $d$ are adjustable on the curved arm which carries them, both up and down and to and from each other, and are thereby adapted for files of varying sizes. Figs. 11, 12, and 13 show the file-holder.

The file 8 is held by its ends entering a three-cornered seat, $d'$, having a round spindle, $d^2$. The spindle fits a hole bored in the end of the holder, and may turn therein. A set-screw is employed to tighten and hold the spindle. These rotatable seats enable the file to be adjusted axially to suit the saw-tooth, and to be partly turned to change corners without removing it.

The pivoted slide-rest $c$ has its pivot at $c'$, and oscillates in a vertical plane. The file-holder arm D reciprocates on the slide-rest. Jaws F, to guide a straight or band saw, are provided. Figs. 15, 16, and 17 show three views of this guide. As the saw passes through the jaws of the guide with the teeth pointing up, a support, $h$, is attached to one of the jaws. The back edge of the saw slides on this support. The screws 9 and 10 are for adjusting the support vertically.

A jaw-guide, G, of different construction, is shown in Figs. 18 and 19, and is adapted for circular saws. In this case the eye of the saw is supported on the laterally-projecting bolt $h'$.

A bracket or slightly-elevated shelf, I, is supported at the front of the machine, and sustains the anvil-blocks $k$. Each block has a set-screw, 11, through it into the bracket, and is supported on its rear side by a screw, 12, which passes through a boss or lug, $k'$, cast integral with the bracket. A guide-block, $l$, is secured on the bracket in front of each anvil-block, and sufficient space is between the anvil-block and guide-block to allow the saw (indicated in Fig. 24 by a broken line) to pass. A gib, $n$, supports the saw while it is passing the anvil-blocks. This gib is vertically adjustable in a slot in the bracket, and is sustained at any desired elevation by screws 13 below. (See Fig. 23.)

The two hammers L, for setting the saw-teeth, are shown in detail in Figs. 6, 7, 8, and 15. Each hammer has the end of its shank or handle 14 secured in a socket, $p$, on a collar, $p'$, by means of a set-screw, 15, in one side of the socket. The hammer may be adjusted higher or lower, or the shank may be turned axially to bring the striking-face of the hammer exactly to the position where it will do the best work.

As seen in Fig. 8, two sleeves, 16, fit loosely on a horizontal fixed shaft, $q$. This shaft is mounted in the two curved standards J, which project over the bracket I. On each sleeve one of the collars $p'$ is secured by a set-screw, 17, whereby the collar may be adjusted longitudinally on the sleeve. Each collar has two shoulders, $p^2$ and $p^3$. Above the shaft $q$ the standards J rise vertically, and a cross-bar, J', connects them at the upper end. Two flat plate-springs, $r$, are secured by one end to this cross-bar, and depend straight downward. The free or lower end of one of these springs presses against the shoulder $p^2$ of one of the collars, serving to keep it turned on the shaft $q$ normally in one direction, while the end of the other spring bears in like manner against the shoulder $p^2$ of the other collar, serving to keep it turned normally in the opposite direction. The result of this arrangement of shoulders and springs is that one hammer strikes the saw-tooth below to the right and the other hammer to the left, and thereby, in one passage of the saw through the machine, all the teeth are properly set—that is, one tooth is slanted in one direction and the next tooth in the opposite direction.

To provide for the exertion of a greater or less pressure by the spring against the shoulder $p^2$, so as to increase or diminish the force of the hammer's blow, set-screws $r'$ are arranged in the cross-bar J' in such manner (see Fig. 6) that the end of the set-screw may be forced against the flat side of the spring $r$, and thereby cause it to press harder against the shoulder $p^2$, or by retraction the screw may be wholly removed from contact with the spring.

The mechanism for actuating the hammers will now be described.

At a position to the rear of the fixed shaft $q$ a rock-shaft, N, has bearings in the two standards J. An adjustable bell-crank lever, O, is mounted on this rock-shaft. The horizontal or upper part, 18, of the lever is adjustable by means of the set-screws 19 and 20 and the slot 21, which latter is occupied by a square head, 22, projecting laterally from the top end of the vertical part. The free end of the upper part of the bell-crank lever carries two pivoted fingers, $s$, one finger being on each side. A stop-pin, 23, prevents the fingers from moving one way, and a spring, 24, holds the finger against the stop-pin, but permits it to be moved the opposite way. The free end of one finger bears down on the shoulder $p^3$ of one collar, and the end of the other finger bears up against the shoulder $p^3$ of the other collar.

The upper part, 18, of the bell-crank lever which carries the two fingers vibrates in a vertical plane. On the down movement of the part 18, one finger engages with one shoulder $p^3$, (see Fig. 6,) causing that hammer to swing to the left, preparatory to striking a blow, while the other finger is permitted by its spring 24 to yield, and thereby pass the other shoulder $p^3$. When the first-mentioned finger has moved down far enough, it will slip off or disengage itself from the shoulder $p^3$, and thereupon the hammer, which had swung to the left, will, by the action of the flat spring $r$, pressing on the shoulder $p^2$, be caused to give a blow on a saw-tooth. In like manner, on the up movement of the part 18 of the bell-crank lever, one finger will operate to cause a blow of one hammer, and the other finger will pass the shoulder $p^3$, which moves the other hammer. A rod, P, connects the bell-crank lever O and a crank-head, R, mounted on one end of a shaft, T, at the rear of the base-plate. A large gear-wheel, U, is mounted on the opposite end of the crank-shaft, and is driven by a gear-wheel, V, exactly one-half the size, mounted on the main shaft $a$. It will thus be seen that the saw-filing and tooth-setting mechanisms are so united in one machine as to operate together, or in unison, whereby a saw may be filed and all its teeth set in one operation.

It will be understood from the foregoing that at each effective movement of the file one hammer strikes. This results from the gearing U and V and the other parts which constitute the connecting mechanism between the file-holders and hammers.

Having described our invention, we claim and desire to secure by Letters Patent of the United States—

1. The herein-described mechanism, consisting of a bell-crank lever, one arm of which carries two pivoted fingers, $s$—one at each side—a stop-pin, 23, to prevent movement of the fingers one way, and a spring, 24, to hold the fingers against the stop-pin, the fingers adapted so that one will bear down while the other bears up, in combination with hammers, each secured to a collar pivoted on a shaft and provided with a shoulder, $p^3$, on which the pivoted finger bears, as set forth.

2. The herein-described adjustable bell-crank lever for actuating the hammers, consisting of the part 18, having a slot, 21, and set-screws 19 and 20, and the part O, having a laterally-projecting square head, 22, which occupies the aforesaid slot, as set forth.

3. The combination of a reciprocating file-holder, two hammers to set the saw-teeth, and mechanism for connecting and operating them, consisting of the shaft $a$, provided with a crank to give motion to the file-holders, and also with a gear-wheel, V, and a shaft, T, provided with a gear-wheel, U, double the size of the first-named gear, and a crank, R, to give motion to the hammers, as set forth.

In testimony whereof we affix our signatures in presence of two witnesses.

JACOB S. DETRICK.
WM. T. SMITH.

Witnesses:
JNO. T. MADDOX,
J. EDWARD MORRIS.